United States Patent [19]

Eroskey

[11] 4,454,263

[45] Jun. 12, 1984

[54] VINYL CHLORIDE POLYMER PLASTISOL COMPOSITION

[75] Inventor: Richard E. Eroskey, Monroe Falls, Ohio

[73] Assignee: The B. F. Goodrich Company, Akron, Ohio

[21] Appl. No.: 489,684

[22] Filed: Apr. 28, 1983

[51] Int. Cl.$^3$ .............................................. C08L 27/06
[52] U.S. Cl. .................................... 523/400; 523/438; 524/567; 524/569
[58] Field of Search ................ 523/400, 438; 524/567, 524/569

[56] References Cited

U.S. PATENT DOCUMENTS

| | | | |
|---|---|---|---|
| 2,919,259 | 12/1959 | Naylor et al. | 524/567 |
| 3,346,532 | 10/1967 | Greene et al. | 523/400 |
| 3,488,314 | 1/1970 | Fuller | 523/400 |
| 3,536,654 | 10/1970 | Lantz et al. | 523/400 |
| 3,819,560 | 6/1974 | Kehr | 523/400 |

*Primary Examiner*—Ronald W. Griffin
*Attorney, Agent, or Firm*—James R. Lindsay

[57] ABSTRACT

A plastisol composition which in the fused state exhibits superior abrasion resistance is described. The plastisol composition in addition to the vinyl chloride polymer paste resin and liquid plasticizer contains as a minor constituent a combination of (a) a polybutadiene diepoxide resin or a cycloaliphatic diepoxide resin, (b) an acid anhydride curing agent for the diepoxide resin, and (c) a cure catalyst for the diepoxide resin.

8 Claims, No Drawings

VINYL CHLORIDE POLYMER PLASTISOL COMPOSITION

BACKGROUND OF THE INVENTION

The present invention relates to a plastisol composition that exhibits improved abrasion resistance when in the fused state.

A plastisol is a suspension of a vinyl chloride polymer in a liquid plasticizer for the vinyl chloride polymer. Vinyl chloride polymers used in plastisol formulations normally are referred to as vinyl chloride "paste resins" or "dispersion resins" and have a relatively small particle size. Commercially available vinyl chloride paste resins typically have an average particle size of from about 2 to 12 micrometers in diameter. Although homopolymers of vinyl chloride are used most frequently in plastisol formulations, copolymer vinyl chloride resins may be used, particularly when the copolymer is able to produce a unique property desired for a specific application. In addition to the vinyl chloride polymer and plasticizer, the plastisol composition frequently contains one or more heat and/or light stabilizers, one or more fillers, and often a colorant. Larger particle size vinyl chloride polymer materials may be used to lower the viscosity of the plastisol composition, or to reduce the cost of the formulation, or to vary the gelation time, or to alter the properties of the fused composition. An addition of a volatile diluent to a plastisol composition will reduce the viscosity of the plastisol. Plastisol compositions to which a volatile diluent has been added usually are referred to as "organosols."

When a plastisol composition is heated, the viscosity of the composition will decrease until the composition reaches a temperature of around 55° C. (which temperature varies somewhat depending on the composition). Thereafter, as the temperature of the composition is raised further, the viscosity of the composition increases rather rapidly until solvation and fusion occur.

Plastisol compositions are used in a variety of processes for manufacturing vinyl chloride polymer-products. Such processes include rotational castings, slush molding, spread and roll coating, strand coating, cavity molding, and spray coating.

SUMMARY OF THE INVENTION

The present invention provides a plastisol composition (which term as used herein shall include organosol compositions, that is, plastisol compositions containing a volatile diluent) which in the fused state exhibits exceptional abrasion resistance. In accordance with the present invention, the plastisol composition contains as a minor constituent a combination of (a) a polybutadiene diepoxide resin or a cycloaliphatic diepoxide resin, (b) an acid anhydride curing agent for said diepoxide resin and (c) a cure catalyst (accelerator) for said diepoxide resin.

DETAILED DESCRIPTION OF THE INVENTION

The present invention pertains to a plastisol composition that contains as a minor constituent a combination of (a) a polybutadiene diepoxide resin or a cycloaliphatic diepoxide resin, (b) an acid anhydride curing agent for the diepoxide resin and (c) a cure catalyst or accelerator for said diepoxide resin.

A plastisol composition broadly is a suspension of a "paste" or "dispersion" type vinyl chloride polymer resin in a liquid plasticizer for the vinyl chloride polymer. In addition to the vinyl chloride polymer and liquid plasticizer, the plastisol composition frequently includes a stabilizer system, one or more fillers, a smoke and/or flame retardant system, and often a colorant.

The vinyl chloride polymer "paste" or "dispersion" resin used in the plastisol composition is comprised of small particles of vinyl chloride polymer which will remain suspended in the liquid plasticizer constituent of the plastisol composition until heated to a gelation temperature. Preferably, the average particle size of the vinyl chloride polymer particles range from about 2 to about 12 micrometers in diameter. The inherent viscosity of the vinyl chloride polymer "paste" or "dispersion" resin, as determined in accordance with ASTM procedure D1243-66, desirably is within the range from about 0.70 to 1.40. Although the "paste" or "dispersion" resin of the plastisol composition preferably is a homopolymer of vinyl chloride (polyvinyl chloride), copolymers of vinyl chloride may be used, in place of or in combination with the homopolymer of vinyl chloride resin, particularly when the presence of the copolymer is able to produce a unique property desired for a specific application that is not obtained when polyvinyl chloride is used as the sole "paste" or "dispersion" resin. Typical vinyl chloride copolymer paste resins are copolymers of vinyl chloride copolymerized with up to 35 percent by weight of vinyl acetate, methylacrylate, ethylacrylate, butylacrylate, or vinylidene chloride.

Any of the liquid plasticizers useful in plastisol compositions can be used in the plastisol composition of the present invention. Liquid plasticizers frequently used in plastisol compositions include dioctyl phthalate, butyl benzyl phthalate tricresyl phosphate, butyl decyl phthalate, dioctyl adipate, dioctyl sebacate trioctyl phosphate, didecyl phthalate, acetyl tributyl citrate, di-2- -ethylhexyl phthalate, diisodecyl phthalate, dihexyl phthalate, dibutyl phthalate, octyldiphenyl phosphate, trioctyl trimellitate, and triisooctyl trimellitate. Desirably, the plastisol compostion contains from 50 to 400 parts by weight of the liquid plasticizer per 100 parts by weight of vinyl chloride polymer paste resin.

Typical cycloaliphatic diepoxide resins which may be used include 3,4-epoxycyclohexyl- methyl-3,4-epoxycyclohexane carboxylate; 3,4-epoxy- -6-methylcyclohexylmethyl-3,4-epoxy-6-methylcyclohexane carboxylate; vinylcyclohexene dioxide; 2-(3,4-epoxycyclohexyl- 5,5-spiro-3,4-epoxy) cyclohexane-meta dioxane; bis(3,4-epoxycyclohexyl) adipate; and 3,9-divinylspirobi (meta dioxane). Of the cycloaliphatic diepoxide resins, 3,4-epoxycyclohexyl- methyl-3,4-epoxycyclohexane carboxylate is preferred.

The polybutadiene diepoxide resin preferably has a molecular weight between 500 and 5000.

Desirably, the polybutadiene diepoxide resin or cycloaliphatic diepoxide resin is present in an amount ranging from 16 to 40 parts by weight of the diepoxide resin per 100 parts by weight of vinyl chloride polymer present in the plastisol composition.

Any of the conventional acid anhydride curing agents for the diepoxide resin used in the plastisol composition may be used. Typical acid anhydride curing agents useful in the present invention include endo-cis-bicyclo (2.2.1)-5-heptene- 2,3-dicarobxylic anhydride, methylbicyclo (2.2.1) heptene-2,3-dicarboxylic anhydride dodecenyl succinic anhydride; succinic anhydrides methyl succinic anhydride; maleic anhydride; phthalic anhydride; 1,4,5,6,7,7-hexachlorobicyclo (2.2.1)-5- heptene-2,3-dicarboxylic anhydride; endo-cis-bicyclo (2.2.1)-2,3-dicarboxylic anhydride; 1,2,3,4-cyclo-pentanetetracarbgoxylic dianhydride; benzophenone- tetracarboxylic dianhydride; ethylene glycol bis-trimellitate; glycerol trimellitate; tetrachlorophthalic anhydride; pyromellitic dianhydride; polyazelaic polyanhydrides; polysebacic polyanhydrides; and multi-ring alicyclic anhydrides such as tetrahydrophthalic anhydride, methyltetrahydrophthalic anhydride and hexahydrophthalic anhydride; citraconic anhydride; itaconic anhydride; tricarballylic anhydride; linoleic acid adduct of maleic anhydride; 4-carboxy-3-methyl-1,2-butane carboxylic anhydride; dichloromaleic anhydride; and chlorendic anhydride. Of the acid anhydride curing agents, methyltetrahydrophthalic anhydride is preferred. Desirably, from 95 to 400, preferably from 95.9 to 99.8, parts by weight of acid anhydride curing agent is present per 100 parts by weight of diepoxide resin present in the plastisol composition.

The cure catalyst (or accelerator) for the diepoxide resin may be any of the conventional catalysts for such diepoxide resin. Typical cure catalysts useful in the present invention include tertiary amines such as dimethylaminoethanol, triethyleneteamine, tributyltin dilaurate, and stannous octoate. Of the various cure catalyst, stannous octoate is preferred. Desirably, from 6 to 50, preferably from 6.25 to 12.5, parts by weight of the cure catalyst for the diepoxide resin per 100 parts by weight of the diepoxide resin desirably is used.

Typical stabilizers for the plastisol composition include basic lead carbonate, dibasic lead phosphite, tribasic lead phosphite, cadmium-zinc or octyltin stabilizers, 2-(2'-hydroxy-5'-methylphenyl)- benzotriazole, and dibutyl tin dilaurate. The stabilizer or combinations of stabilizers used are selected usually to protect the polymer against heat and/or light-degradation. Generally, if a stabilizer is used, from 2.0 to 10 parts by weight of stabilizer is used per 100 parts by weight of vinyl chloride polymer present in the plastisol composition.

Fillers usually are added to plastisol compositions to serve as a diluent and, thereby, to reduce costs. Typical fillers which may be used include aluminum silicate, calcium carbonate, magnesium silicate, silica, zirconium silicate, hydrated alumina, lithium aluminum silicate and dimethyldioctadecylammonium bentonite. Although the amount of filler used can vary depending upon the proportions desired, when a filler is included in the plastisol composition of the present invention usually only up to about 50 parts by weight of filler is included in the composition per 100 parts by weight of vinyl chloride polymer present in the composition, since the presence of larger amounts of filler will be detrimental to the use of the plastisol composition for applications where abrasion resistance is important.

The components of the plastisol composition can be combined by any convenient mixing procedure. The vinyl chloride polymer paste resin usually first is blended with the plasticizer component of the plastisol formulation. A simple planetary mixer may be used. Only enough shear is needed to break up the loose agglomerates of resin. The temperature should be kept below a temperature at which solvation occurs between the resin and plasticizer. The other ingredients are added to the mixer and mixing is continued until a uniform dispersion is obtained. If desired, the fillers, stabilizers, etc. can be blended into the plasticizer before the vinyl chloride polymer paste resin is added. Desirably, the plastisol composition is aged for at least 1 to 2 hours to permit air entrapped in the mix to escape from the plastisol.

The plastisol compositions of the present invention are useful in making products customarily made from plastisols. In the fused state they exhibit exceptional abrasion resistance which makes them particularly useful for making products where abrasion resistance is of importance, for example, in conveyor belt construction where a belt surface showing good wear resistance is needed.

The present invention is illustrated by the following example.

EXAMPLE

Plastisol compositions were formulated in an internal mixer using the following recipes:

| Material | Parts by Weight | | | | |
|---|---|---|---|---|---|
| | Control | Sample 1 | 2 | 3 | 4 |
| Compound 370-668* | 100.0 | 100.0 | 100.0 | 100.0 | 100.0 |
| Cycloaliphatic diepoxide** | — | 16.0 | 24.0 | 32.0 | 40.0 |
| Methyltetrahydrophalic anhydride | — | 15.35 | 23.0 | 30.7 | 38.4 |
| Stannous octolate | — | 3.2 | 3.2 | 3.2 | 3.2 |

*Compound 370-668:

| Material | Parts by Weight |
|---|---|
| Polyvinyl chloride paste resin (Geon 128) | 100.0 |
| Dioctyl phthalate | 50.0 |
| Butyl benzyl phthalate | 45.0 |
| Calcium oxide | 10.0 |
| Brown iron oxide | 2.0 |
| Stabilizer (cadmium-zinc type) | 2.0 |

**3,4-epoxycyclohexylmethyl-3,4-epoxycyclohexane carboxylate.

The abrasion resistance of the plastisol compositions were tested in accordance with the test procedure set forth in ASTM Procedure D2228-89 using a Pico abrader tester. Sample test buttons were molded for 15 minutes at 177° C. (350° F.) A 15 knife, 3000 gram load and 240 revolutions were used to measure the abrasion resistance of the fused sample. The results of the tests are set forth in Table I.

TABLE I

| | Control | Sample 1 | 2 | 3 | 4 |
|---|---|---|---|---|---|
| Weight loss (grams) | .1338 | .0966 | .0653 | .0414 | .0397 |
| Volume loss (%) | .1088 | .0787 | .0416 | .0264 | .0253 |

The improved abrasion resistance of the fused plastisol compounds make the plastisol compositions particularly useful for providing a covering more resistant to wear than conventional plastisol materials.

I claim:

1. A plastisol composition comprising a vinyl chloride polymer paste resin having an average particle size of from about 2 to 12 micrometers and from 50 to 400 parts by weight of a liquid plasticizer for said vinyl chloride polymer paste resin per 100 parts by weight of said vinyl chloride polymer paste resin, and as a minor constituent of said plastisol composition a combination of:
   (a) a polybutadiene diepoxide resin or a cycloaliphatic diepoxide resin,
   (b) an acid anhydride curing agent for said diepoxide resin, and
   (c) a cure catalyst for said diepoxide resin, said combination containing from 95 to 400 parts by weight of said acid anhydride curing agent for every 100 parts by weight of said diepoxide resin and from 6 to 50 parts by weight of said cure catalyst for every 100 parts by weight of said diepoxide resin.

2. A plastisol composition of claim 1 wherein a cycloaliphatic diepoxide resin is employed in said combination.

3. A plastisol composition of claim 2 wherein said cycloaliphatic diepoxide resin is 3,4-epoxycyclohexylmethyl-3,4-epoxy cyclohexane carboxylate.

4. A plastisol composition of claim 3 wherein said acid anhydride curing agent is 3,4-epoxycyclohexylmethyl- 3,4-epoxycyclohexane carboxylate, wherein said acid anhydride curing agent is methyltetrahydrophthalic anhydride, and wherein said cure catalyst for the diepoxide is stannous octoate.

5. A plastisol composition of claim 1 wherein said acid anhyride curing agent is methyltetrahydrophthalic anhydride.

6. A plastisol composition of claim 1 wherein said cure catalyst for the diepoxide is stannous octolate.

7. A plastisol composition of claim 1 wherein from 9.59 to 99.8 parts by weight of said acid anhydride curing agent and from 6.25 to 12.5 parts by weight of said cure catalyst for said diepoxide resin is used for every 100 parts by weight of said diepoxide resin in said plastisol composition.

8. A plastisol composition of claim 1 wherein from 16 to 40 parts by weight of said diepoxide resin is present per 100 parts by weight of said vinyl chloride polymer paste resin.

* * * * *